March 31, 1959 A. W. MASSMAN 2,880,361

COLOR TELEVISION RECEIVER

Filed May 23, 1955

INVENTOR.

Albert W. Massman

BY

Mueller & Aichele

Attys

United States Patent Office 2,880,361

Patented Mar. 31, 1959

2,880,361

COLOR TELEVISION RECEIVER

Albert W. Massman, Wheaton, Ill., assignor to Motorola, Inc., Chicago, Ill., a corporation of Illinois Application May 23, 1955, Serial No. 510,257

5 Claims. (Cl. 315—13)

This invention relates to color television receivers and more particularly to the dynamic convergence system in a tri-beam cathode ray tube as used in such television receivers.

Many present day color television receivers utilize a cathode ray image reproducing tube wherein a plurality of electron beams are emitted from spaced sources at one end of the tube, which beams are then scanned across a viewing screen at the other end of the tube to produce distinct color images of so-called primary colors which appear to the human eye as a complete color picture. One type of color tube in common use employs a multicolored sensitive surface having a plurality of groups of phosphor dot or triads, each dot of which emits light of a different primary color when impinged upon by an electron beam. Each triad is aligned with an opening of an apertured shadow mask which is between the triad and the beam sources. The electron beams are modulated with color information and are scanned across the shadow mask so that the individual beams strike a proper phosphor dot of every triad. Each triad then comprises a colored element of the completed color picture.

It is common to deflect the three electron beams emanating from separated sources within the cathode ray tube all by a common horizontal and vertical deflection system in order that they may scan the shadow mask and the triads of phosphor dots. The three beams must be converged, however, at each aperture of the shadow mask in order that they may pass therethrough to impinge upon the proper phosphor dots and such convergence must be maintained throughout each scanning cycle of the beam. However, since the electron beams are scanned through wide angles across the shadow mask, all parts of which are not equidistant from the sources of the beams, the amount of convergence effect applied to the beams must be varied during each scanning cycle and, therefore, a varying or dynamic convergence control of the beams must be used. It has been found that signals of parabolic wave form recurring at the horizontal and vertical deflection frequencies may be used to produce the necessary dynamic convergence control of the beams to converge them in the plane of the shadow mask and maintain them converged as they are scanned to various positions in each scanning cycle.

Accordingly, in some circuits which provide dynamic convergence of the beams a satisfactory procedure has been the utilization of a small portion of the horizontal and vertical deflection signals for developing properly synchronized parabolic wave forms to obtain dynamic convergence of the beams. However, such an arrangement will affect the beam deflection signals and some of the prior art dynamic convergence systems have required an undue amount of power which has a deleterious effect on the beam scanning system. Furthermore, it is desirable that the dynamic convergence control signal be of the proper wave form, that is, that it have a certain shape, and some of the prior art systems have not been altogether satisfactory in this respect.

Accordingly, it is an object of this invention to provide a dynamic convergence control system powered by the beam sweep system in a television receiver, which convergence system produces a control signal having an improved wave shape and closely resembling a desirable symmetrical parabolic shape.

Another object is to provide a dynamic convergence system which requires a minimum of operating energy from the beam deflection system of the receiver and more particularly which causes a minimum of power loss in the vertical sweep system of the receiver.

A feature of the invention is the provision of a signal integrating network, in the output circuit of the vertical sweep system in a color television receiver, which has a low direct current resistance but sufficient impedance and integrating properties to develop parabolic signals at the vertical sweep frequency suitable for dynamic convergence purposes thus minimizing losses in the vertical sweep system.

Another feature of the invention is the provision of a parallel coupled inductor and capacitor connected in the direct current power supply lead for the vertical output tube. The inductor and capacitor form an integrating network which provides dynamic convergence signals of improved parabolic form since the network may have the required characteristics with low values of resistance.

Further objects, features and the advantages thereof will be apparent upon consideration of the following description when taken in conjunction with the accompanying drawing in which.

Figures 1, 2, 3:
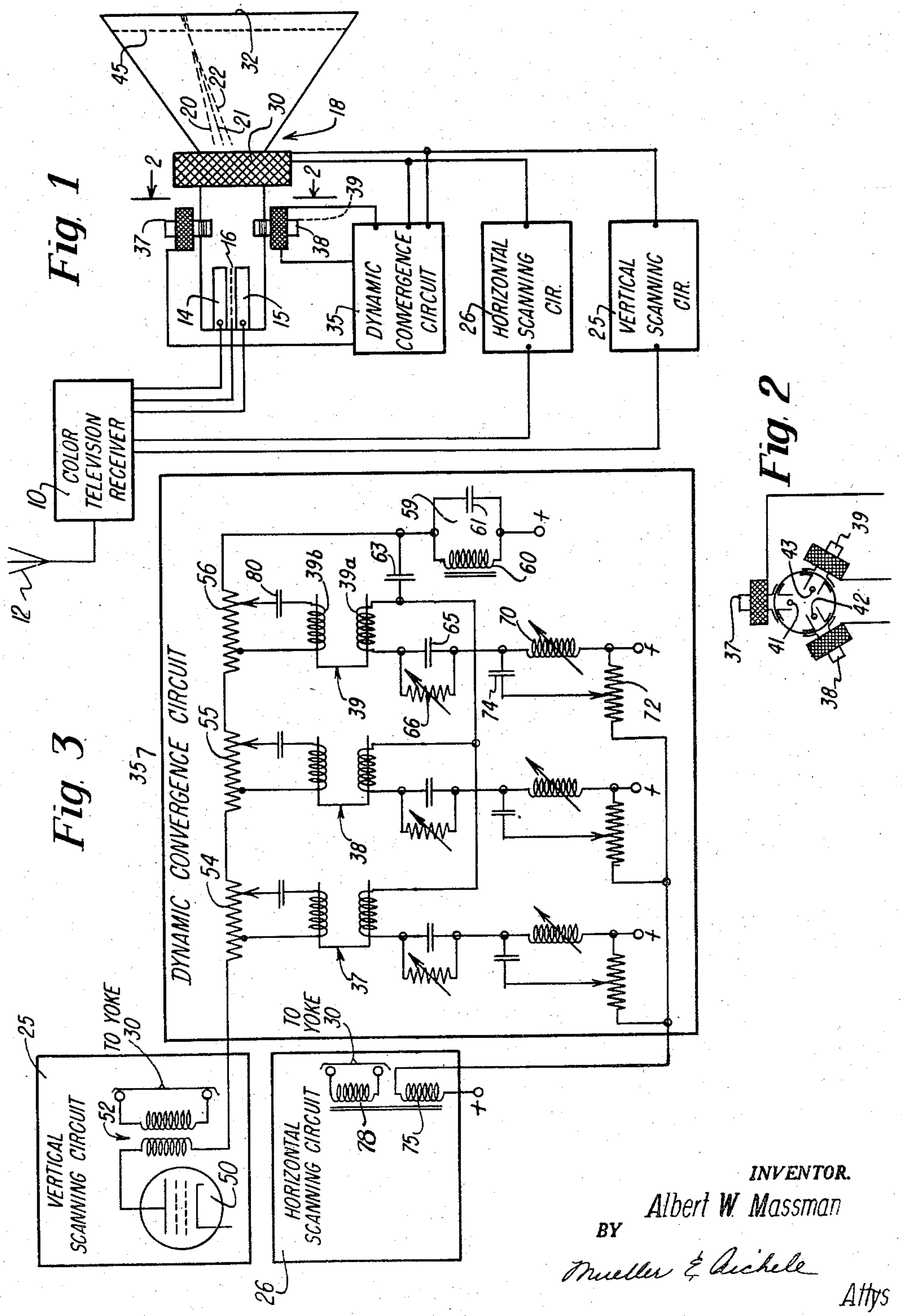
Fig. 1 is a diagrammatic representation of a color television receiver using a tri-beam cathode ray tube.
Fig. 2 is a sectional view along the lines 2—2 of Fig. 1.
Fig. 3 is a schematic diagram of the dynamic convergence system of the present invention.

In practicing the invention, there is provided a dynamic convergence system for a tri-beam cathode ray tube as used in a color television receiver. A parabolic wave form is obtained from the vertical sweep system by an integrating network series coupled in the anode circuit of the vertical output tube. The integrating network comprises a parallel coupled inductor and capacitor which form a low resistance direct current path for the potential applied to the output tube anode so that the effect on the vertical sweep signal is minimized. At the same time, the network provides a signal of parabolic wave form having an improved shape rendering it highly satisfactory for dynamic convergence control. A series of dynamic convergence coils mounted on the neck of the reproducer adjacent the beam paths therein are each series connected with source of dynamic convergence signals at the horizontal deflection frequency, and each convergence coil and the source of horizontal convergence signals are series coupled across the integrating network. This integrating network is a low impedance path for the dynamic convergence signals at the horizontal frequency, and the source of the convergence signals at the horizontal frequency is a low impedance path for the dynamic convergence signals at vertical frequency so that there is no harmful intercoupling between the sources of both the horizontal and vertical convergence signals.

Referring now to the drawing, a detailed description of the invention will be given. In Fig. 1, there is shown a color television receiver 10 to which is coupled an antenna 12 which supplies signals thereto. Receiver 10 is coupled to electron guns 14, 15 and 16 in cathode ray color image reproducer tube 18 so that electron beams 20, 21 and 22 produced by the electron guns may be modulated according to color information of a received color television signal. Also coupled to the receiver 10 are a vertical scanning circuit 25 and a horizontal scanning circuit 26, which respectively produce frame and line scanning of the electron beams. Signals produced by circuits 25 and 26 are applied to the deflection electrode or yoke 30 to establish appropriate magnetic fields which scan or sweep the electron beams across screen 32 of cathode ray tube 18. As previously mentioned, screen 32 consists of many triad groups each containing three phosphor dots which are each energized by a different one of the electron beams to produce what appears to the eye as a colored dot constituting an element of the completed picture.

The dynamic convergence circuit 35 is also coupled to the vertical and horizontal scanning circuits 25, 26 and the output of circuit 35 is applied to the three dynamic convergence electrodes or coils 37, 38 and 39 (Fig. 2). Coils 37—39 are disposed adjacent the paths 41—43 respectively of the electron beams through the neck of the cathode ray tube 18. The control effect produced by coils 37—39 maintains the electron beams 20—22 in convergence as they are scanned across screen 32 so that each consistently falls upon its intended phosphor dot. The beams are actually converged in apertures of shadow mask 45, which is disposed adjacent screen 32 and prevents undesired energization of the phosphor dots as the three beams are scanned between groups of these dots.

Referring now to Fig. 3, in which there is shown a schematic diagram of the dynamic convergence circuit 35, it may be seen that the anode of vertical output tube 50 is series-connected to the primary winding of vertical output transformer 52 which supplies the vertical deflection signal to yoke 30. The primary of transformer 52 is also connected through series-connected resistors 54, 55 and 56 to a parallel combination of an inductance coil 60 and capacitor 61. The other side of the parallel combination, which will be referred to as integrating network 59 is connected to a positive potential source.

The three dynamic convergence coils 37, 38 and 39 are all similarly connected in this circuit so that a specific description need be given only in connection with coil 39. Coil section 39*a* of convergence coil 39 is coupled through blocking capacitor 63 to the junction of resistor 56 and the integrating network 59. The other side of coil 39*a* is connected to a parallel combination of capacitor 65 and variable resistor 66, which combination is connected to the positive potential source through a variable inductance coil 70. The arm of variable resistor 72 is connected through capacitor 74 to the junction of coil 70, capacitor 65, and variable resistor 66. The stationary terminals of resistor 72 are connected across winding 75 of horizontal output transformer 78. One side of coil 75 is also returned to the positive potential source. It should be noted that one side of coil section 39*b* of dynamic convergence coil 39 is coupled to a tap on resistor 56, while the other side of coil 39*b* is coupled through blocking capacitor 80 to the variable arm of resistor 56.

Having thus described the connection of the circuit shown, the operation thereof will now be given. As is customary in television receivers of this type, electron tube 50, constituting the vertical output tube, is driven so that the plate current thereof is a sawtooth wave form at 60 cycles per second and the signal applied by transformer 52 to the yoke 30 produces vertical scanning of the electron beams in reproducer 18. The current of sawtooth form will pass through resistors 54—56 and through the network 59. This integrating network has constants selected to integrate the vertical deflection signal and to develop a small voltage of parabolic wave form which is applied to coil 39*a* by way of capacitor 63, resistor 66 and inductor 70. The value of resistor 66 may be varied in order to adjust the amplitude of the parabolic signal applied to coil 39*a*, and this signal will generally be of the proper form to maintain convergence of one of the electron beams as it is scanned in a vertical direction.

Winding 75 of the horizontal output transformer 78 presents a pulse of horizontal deflection frequency, i.e. 15,750 cycles per second, and a portion of this pulse may be tapped from resistor 72 and applied to inductor 70 and capacitor 74. This inductor and capacitor are resonant substantially at the horizontal sweep frequency and will therefore develop a sine wave signal at this frequency. The amplitude of this signal may be varied by adjustment of variable resistor 72 and a change in the phase thereof with respect to the horizontal deflection signal may be obtained by variation of inductor 70. Accordingly, the signal developed in inductor 70 is applied to coil 39*a* through capacitor 65 as well as capacitor 63 and capacitor 61. As more fully explained in the copending application of Edward J. Hauge, filed November 30, 1954, Serial No. 472,033, the sine wave developed by the resonant circuit consisting of inductor 70 and capacitor 74 will produce a signal which is a close approximation to the desired parabolic wave form to obtain dynamic convergence of the electron beams as they are scanned in the horizontal direction. It should also be explained that the reactance of capacitors 61, 63 and 65 is low at the horizontal scanning frequency so that coil 39*a* is effectively in parallel with inductor 70 at this frequency and that the reactance of capacitor 63 and inductor 70 is sufficiently low at the vertical frequency so that coil 39*a* is effectively in parallel with integrating network 59 at the vertical scanning frequency. The reactance of capacitor 65 is considerably higher than the resistance of resistor 66 at the vertical scanning frequency so that the setting of resistor 66 governs the vertical convergence signal level without unduly influencing the horizontal convergence signal.

In a practical construction of the system, it may sometimes be desirable to tilt the parabola at the vertical frequency in order to obtain the optimum convergence of the electron beams in all the deflected positions thereof. Accordingly, a small portion of the vertical sawtooth deflection signal is applied to coil 39*b* which is mounted adjacent coil 39*a* so that its field will combine with the field of coil 39*a*. Therefore, by variation of the variable arm of resistor 56 on either side of the tap connection to that resistor, a desired amount of the sawtooth wave form may be applied in the proper phase to coil 39*b* in order that convergence coil 39 produces a resultant field which corresponds to that produced by a parabolic wave form having a desired amount of tilt.

It should be pointed out that the parabolic wave form at the vertical scanning frequency produced by the integrating network 59 has a desirable wave form, since the inductance coil 60 may have a comparatively low resistance, thus making the time constant of the network 59 of suitable duration while at the same time maintaining the network of low impedance at the horizontal scanning frequency in order to by-pass signals of this frequency as previously described. Furthermore, there will be a minimum of direct current voltage drop across the integrating network 59 since inductance coil 60 may have a comparatively low direct current resistance. Therefore, there will be a minimum power loss in the network and the voltage applied to the anode of electron tube 50 will not be appreciably reduced by the dynamic convergence system, to minimize the influence of the convergence system upon the beam deflection system.

I claim:

1. In a color television receiver including a cathode ray tube having a screen across which a plurality of electron beams are scanned in vertical and horizontal directions, the dynamic convergence circuit for varying the convergence of the beams in accordance with their scanned positions including in combination, a vertical output stage including an electron discharge device having an output element at which appears a vertical sweep signal of given frequency and sawtooth form, potential supply means, an inductance coil and a capacitor directly connected in parallel forming an integrating network at the frequency of said vertical sweep signal, a vertical output transformer for providing a vertical scanning signal for the beams and including a primary winding having one side coupled to said output element and having another side coupled through said integrating network to said potential supply means, and means for coupling dynamic convergence field producing means to said integrating network so that an integrated signal is applied thereto from said network for converging the beams in accordance with an integrated form of said vertical sweep signal.

2. A color television receiver including in combination, a cathode ray tube having a screen and sources of electron beams, a deflection yoke, a beam deflection system including circuit means for producing a sawtooth beam deflection signal of given frequency for deflecting the beams across said screen, said circuit means including an electron valve and a coupling circuit connected to said deflection yoke and in which said beam deflection signal appears, potential supply means for supplying power to said circuit means, a signal integrating network comprising inductor means and capacitor means coupled in parallel for integrating the beam deflection signal, said integrating network being series connected with said coupling circuit and said potential supply means and providing a low impedance to a reference point, and beam convergence inductor means coupled to said integrating network so that said beam deflection signal is formed by said integrating network and applied to said beam convergence inductor means for converging the beams in accordance with their scanned positions.

3. In a color television receiver including a tri-beam cathode ray tube having a deflection yoke and sources of horizontal and vertical beam scanning signals of sawtooth wave form for energizing the yoke, the dynamic beam convergence circuit including in combination an electron valve in the source of vertical scanning signals having cathode, grid and anode electrodes, a vertical output transformer adapted to be coupled to the yoke to supply vertical scanning signals thereto and having a primary winding, an integrating network comprising an interconnected capacitor and inductor, said capacitor and inductor having values to integrate the vertical scanning signals of sawtooth wave form to provide convergence signals of substantially parabolic form, means coupling said primary winding and said integrating network in series with a direct current potential source across said cathode and anode electrodes to form a direct current energization circuit for said electron valve, field producing means adapted to provide a convergence effect in the cathode ray tube, and means coupling said field producing means to said integrating network for energizing said field producing means with the convergence signals.

4. In a color television receiver including a tri-beam cathode ray tube having a deflection yoke and sources of horizontal and vertical beam scanning signals of sawtooth wave form for energizing the yoke, the dynamic beam convergence circuit including in combination an electron valve in the source of vertical scanning signals having cathode, grid and anode electrodes, a vertical output transformer adapted to be coupled to the yoke to supply vertical scanning signals thereto and having a primary winding, an integrating network comprising a capacitor and an inductor interconnected in parallel without resistance elements, said capacitor and inductor having values to integrate the vertical scanning signals of sawtooth wave form to provide convergence signals of substantially parabolic form, means coupling said primary winding and said integrating network in series in a direct current energization circuit for said electron valve with one portion of said integrating network established at a reference level for signal frequencies, a convergence coil adapted to provide a convergence effect in the cathode ray tube, and means coupling said convergence coil to said inductor for energizing said field producing means with the convergence signals with respect to the reference level.

5. In a color television receiver including a cathode ray tube utilizing a plurality of beam components, and a deflection system for scanning the beam components to produce a raster, the dynamic convergence circuit to provide signals of substantially parabolic wave form at the scanning frequency for dynamically converging a beam component, including in combination, a direct current conducting circuit in the deflection system in which appears a scanning signal of sawtooth wave form, said circuit including a parallel connected capacitor and inductor with said inductor series connected in said circuit, said capacitor and inductor having respective values to form an integrating network at the frequency of the scanning signal of sawtooth wave form thereby developing substantially parabolic signals of the scanning frequency, and field producing means adapted to control a beam component in the cathode ray tube and coupled to said integrating network to utilize the substantially parabolic signals for dynamic convergence of the beam component.

References Cited in the file of this patent

UNITED STATES PATENTS

| | | |
|---|---|---|
| 2,672,574 | Evans | Mar. 16, 1954 |
| 2,706,796 | Tannenbaum et al. | Apr. 19, 1955 |
| 2,707,248 | Goodrich | Apr. 26, 1955 |
| 2,726,354 | Stark | Dec. 6, 1955 |
| 2,729,764 | Dietch | Jan. 3, 1956 |